(12) United States Patent
Oh et al.

(10) Patent No.: US 12,216,484 B2
(45) Date of Patent: Feb. 4, 2025

(54) VOLTAGE REFERENCE CIRCUIT

(71) Applicant: Apple Inc., Cupertino, CA (US)

(72) Inventors: Sechang Oh, Lexington, MA (US); Soheil Golara, San Jose, CA (US); Denis C. Daly, Wellesley, MA (US); Seyedeh Sedigheh Hashemi, Santa Clara, CA (US); Mansour Keramat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 18/340,759

(22) Filed: Jun. 23, 2023

(65) Prior Publication Data

US 2024/0427361 A1    Dec. 26, 2024

(51) Int. Cl.
  *G06F 1/26*   (2006.01)
  *G05F 1/46*   (2006.01)
  *G05F 1/56*   (2006.01)

(52) U.S. Cl.
  CPC .............. *G05F 1/468* (2013.01); *G05F 1/56* (2013.01); *G06F 1/26* (2013.01)

(58) Field of Classification Search
  CPC .............. G05F 1/468; G05F 1/56; G06F 1/26
  See application file for complete search history.

(56) References Cited

U.S. PATENT DOCUMENTS

| | | |
|---|---|---|
| 8,193,589 B2 | 6/2012 | Dix |
| 9,122,290 B2 | 9/2015 | Eberlein |
| 9,665,116 B1 | 5/2017 | Arnold et al. |

*Primary Examiner* — Zahid Choudhury
(74) *Attorney, Agent, or Firm* — Kowert, Hood, Munyon, Rankin & Goetzel, P.C.; Dean M. Munyon

(57) ABSTRACT

A voltage reference circuit included in a computer system includes an asymmetric amplifier circuit that includes two metal-oxide semiconductor field-effect transistors with different threshold voltages. The voltage reference circuit also includes an output circuit that generates, using a control signal, a bias signal and an output current that is used by a divider circuit to generate a reference voltage and a feedback voltage. The reference voltage and bias signal are used by the amplifier circuit to generate the control signal, which is based on a difference between the transistors' threshold voltages.

20 Claims, 9 Drawing Sheets

VOLTAGE REFERENCE CIRCUIT

BACKGROUND

Technical Field

This disclosure relates to analog circuits in computer systems and, more particularly, to voltage reference circuits.

Description of the Related Art

Modern computer systems include many circuits that need to maintain their operation regardless of variations in the manufacturing process, power supply voltage level, and temperature. Such circuits can include analog-to-digital converter circuits, digital-to-analog converter circuits, radio-frequency (RF) circuits, high-speed input/output (I/O) circuits, and the like.

To maintain stable operation across variations in process, voltage, and temperature (PVT), circuits rely on stable voltages and currents that exhibit little dependence on power supply voltage and process parameters, and a well-defined dependence on temperature. For example, the voltage gain and noise of a differential amplifier circuit is dependent on a current used to bias a differential pair of transistors included in the differential amplifier circuit.

One technique to generate a voltage or current that varies little with process variation and changes in power supply voltage is to base the voltage or current on a physical property of silicon. A commonly used property of silicon that is employed in many reference circuits is the band or energy gap of silicon. The band gap refers to an energy range in silicon where no electronic states can exist. Using the band gap allows the generation of currents and voltages that vary little with variations in process and power supply voltage.

DETAILED DESCRIPTION OF EMBODIMENTS

Figure 1:
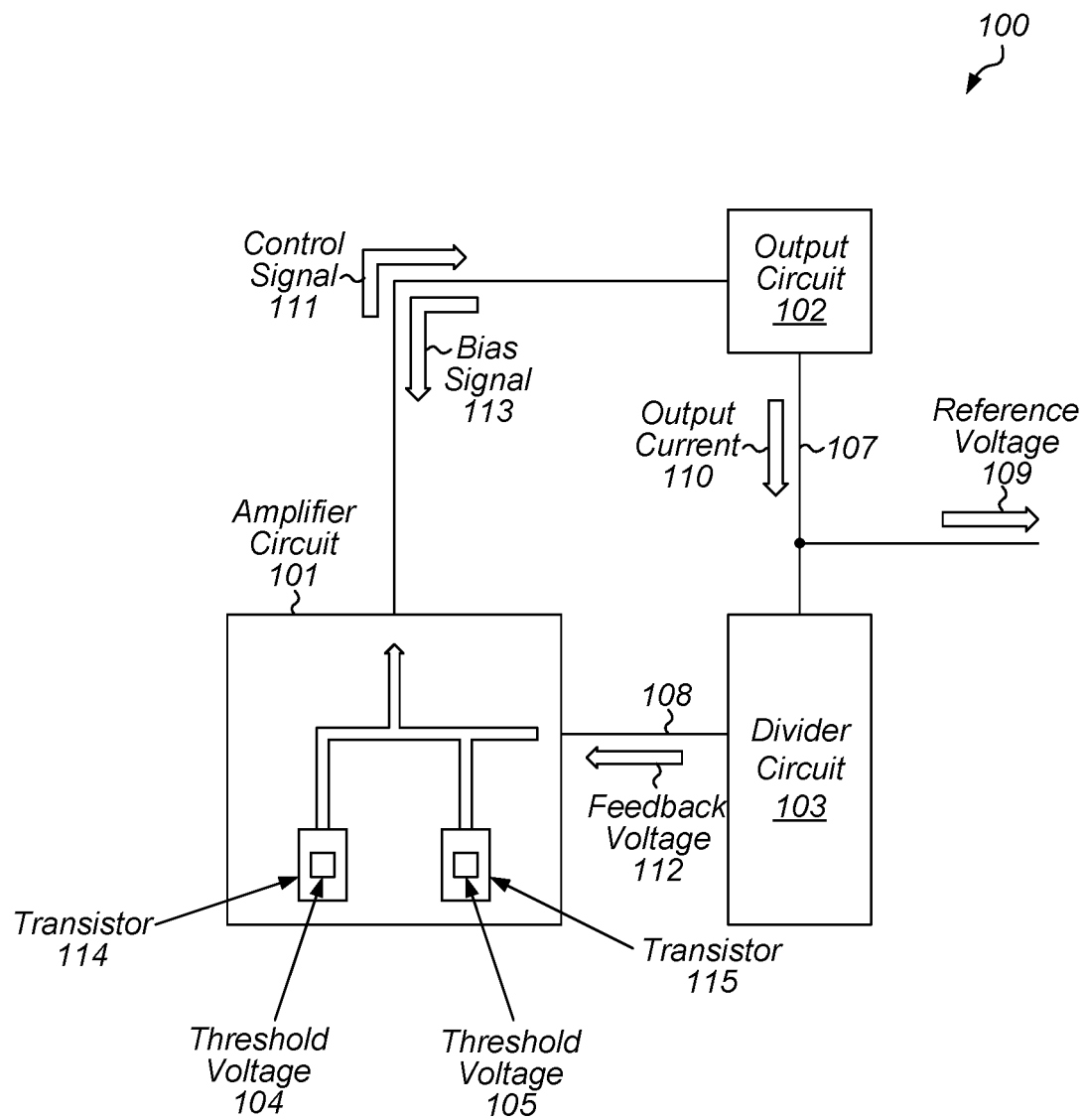
FIG. 1 is a block diagram of an embodiment of a voltage reference circuit for a computer system.

Computer systems may include multiple circuit blocks configured to perform specific functions. Such circuit blocks may include analog, mixed-signal, and radio-frequency (RF) circuits. Such circuits may include power detection circuits, performance monitoring circuits, temperature sensor circuits, power converter circuits, voltage regulator circuits, and the like.

Reference circuits that are based on the band gap of silicon commonly employ bipolar junction transistors (BJTs) as a means of harnessing the silicon band gap voltage. Some semiconductor processes (referred to as "BiCMOS processes") allow for the use of both BJTs and metal-oxide semiconductor field-effect transistors (MOSFETs) on a common integrated circuit. When using a more conventional complementary metal-oxide semiconductor (CMOS) manufacturing process, explicit BJTs may not be available, but may be constructed using available layers of n-type and p-type doped silicon. Aggressive scaling in modern semiconductor manufacturing processes may prohibit the use of any type of bipolar structure, limiting the use of band-gap based voltage reference circuits.

The aggressive scaling of semiconductor manufacturing technology has also resulted in reduced power supply voltage levels. Such power supply voltage levels reduce the available voltage range needed to maintain devices in voltage reference circuits operating in saturation (referred to as "head room"). To maintain operation at power supply voltage levels below the native bandgap reference voltage (approximately 1.25V), many voltage reference circuits rely on a current-mode circuit topology that generates a reference voltage based on a difference between a proportional-to-absolute temperature (PTAT) current and a complementary-to-absolute-temperature (CTAT) current. By combining a PTAT current with a CTAT current on a circuit node, the differing relationships to temperature cancel each other out, resulting in a voltage on a circuit node whose variation is minor with respect to temperature.

In some cases, power supply voltage levels are insufficient to bias BJTs, preventing their use in voltage reference circuits even with a current-mode architecture. Without BJTs, voltage circuits rely on MOSFETs, which are sensitive to bias levels and subject to variation in their electrical characteristics resulting from the manufacturing process.

To address the issues in voltage reference circuits when BJTs are unavailable or when power supply voltage levels are insufficient to properly bias BJTs, an asymmetric MOSFET-based differential pair architecture can be employed. By employing MOSFETs with different threshold voltages in the differential pair, asymmetric amplification can be employed to generate a reference voltage based on a difference between the threshold voltages. The embodiments illustrated in the drawings and described below provide techniques for generating a reference voltage that allows operation at power supply voltage levels insufficient for BJT operation, or when BJTs are unavailable, by using a MOSFET-based differential pair with different threshold voltages and feedback based on the generated reference voltage.

A block diagram of a voltage reference circuit is depicted in FIG. 1. As illustrated, voltage reference circuit 100 includes amplifier circuit 101, output circuit 102, and divider circuit 103.

Output circuit 102 is configured to generate output current 110 using control signal 111 and bias signal 113. As described below, output circuit 102 may include a current mirror circuit configured to generate multiple currents, including output current 110, based on an initial current generated and based on a voltage level of control signal 111.

Divider circuit 103 is configured to generate reference voltage 109 and feedback voltage 112 using output current 110. In various embodiments, a voltage drop across divider circuit 103 resulting from output current 110 may correspond to reference voltage 109. As described below, divider circuit 103 may, in various embodiments, be implemented using a resistive divider circuit. In some cases, corresponding values of one or more of a group of resistors included in the resistive divider circuit may be adjusted using a trim control signal to adjust the value of reference voltage 109 and/or feedback voltage 112. Such trimming may be used to compensate for variations across different integrated circuits created during the manufacturing process.

Amplifier circuit 101 includes transistors 114 and 115 that are manufactured according to a particular manufacturing process having a plurality of available threshold voltages. Transistor 114 has threshold voltage 104 of the plurality of threshold voltages, and transistor 115 has threshold voltage 105 of the plurality of threshold voltages. In various embodiments, threshold voltage 104 is different than threshold voltage 105. Amplifier circuit 101 is configured to generate control signal 111 using feedback signal 112, bias signal 113, and a difference between threshold voltage 104 and threshold voltage 105. As described below, amplifier circuit 101 may be implemented as an asymmetric differential amplifier circuit configured to amplify a difference between two input signals using an offset that is generated using the difference between threshold voltage 104 and threshold voltage 105.

A semiconductor manufacturing process may allow for one of multiple different threshold voltages to be specified for a given transistor during the design of a circuit. For example, a semiconductor process may allow for a transistor to be specified as having a high threshold voltage (commonly referred to as "HVT"), a standard threshold voltage (commonly referred to as "SVT"), or a low threshold voltage (commonly referred to as "LVT"). Once a threshold voltage has been specified for a transistor, different processing steps may be performed during manufacture to achieve the specified threshold voltage. For example, different channel implants or different gate work functions may be employed to achieve a desired threshold voltage.

Available threshold voltages for a semiconductor process typically refer to nominal values of corresponding ranges of values. For example, the nominal threshold voltage for a SVT transistor may be 0.3 volts, while the nominal threshold voltage for a LVT device may be 0.2 volts. During manufacture, variations in lithography, deposited implanted impurities, and the like, can affect the threshold voltages of transistors resulting in a distribution of threshold voltages centered at the nominal values. Such distributions correspond to manufacturing variation across an integrated circuit and from one integrated circuit to the next. The variation in a semiconductor process can result in different threshold voltage values for transistors that are intended to have identical electrical characteristics.

Each nominal threshold voltage available in a semiconductor manufacturing process can have its own associated distribution of values. In general, the manufacturing process is controlled so that the respective distributions for the nominal threshold voltages in a semiconductor manufacturing process do not overlap. In other words, there is no intersection between the range of values for a particular nominal threshold voltage and the range of values for a different nominal threshold voltage.

As used herein, when two transistors are stated as having different threshold values, this is referring to the transistors' specified nominal threshold voltage values, and not manufacturing variation associated with a particular nominal threshold voltage value. For example, in some embodiments, threshold voltage 104 may be a SVT and threshold voltage 105 may be a LVT. Alternatively, threshold voltage 104 may be a LVT and threshold voltage 105 may be a SVT. In the embodiment described herein, the respective nominal values of threshold voltage 104 and threshold voltage 105 are selected during the design process to have different values.

Figure 2:
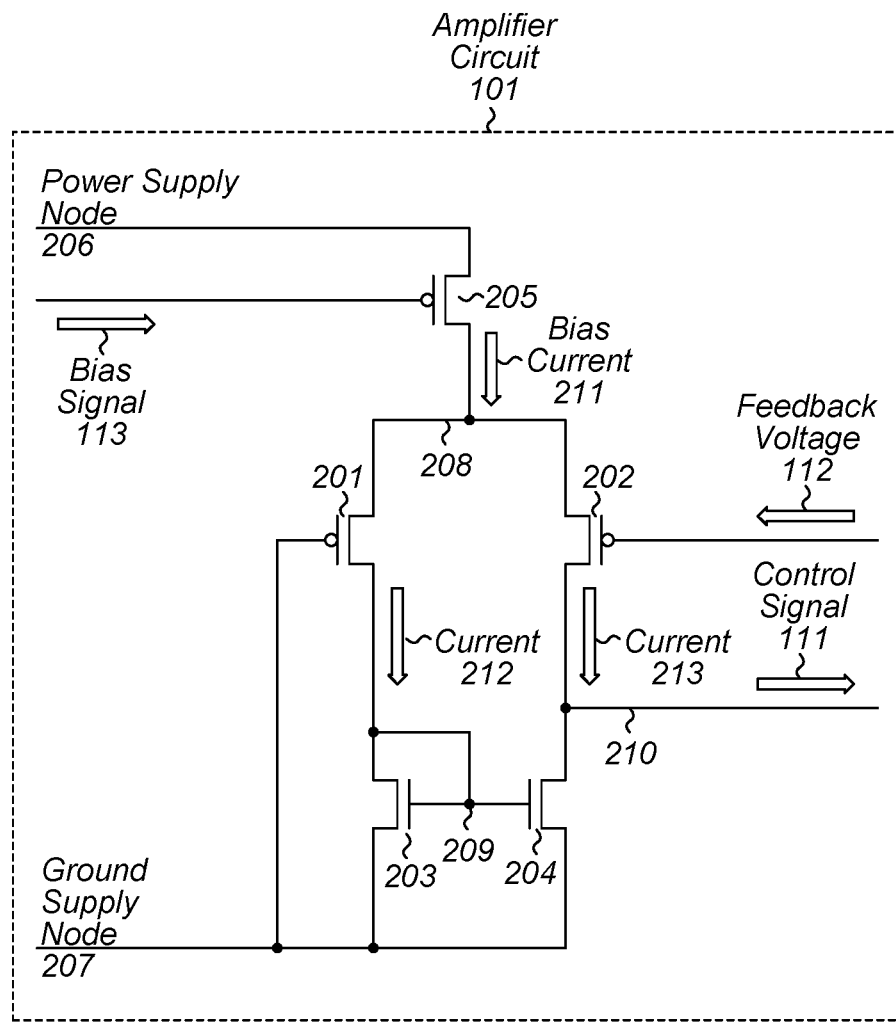
FIG. 2 is a block diagram of an embodiment of an amplifier circuit for a voltage reference circuit.

Turning to FIG. 2, a block diagram of amplifier circuit 101 is depicted. As illustrated, amplifier circuit 101 includes transistors 201-205. It is noted that although transistors 201-205 are depicted as individual transistors, in other embodiments, any of transistors 201-205 may be implemented using any suitable number of transistors coupled together in a series and/or parallel arrangement.

Transistor 205 is coupled between power supply node 206 and node 208, and is controlled by bias signal 113. In various embodiments, transistor 205 is configured to generate bias current 211 by adjusting a conductance between power supply node 206 and node 208 based on a voltage level of bias signal 113. In various embodiments, a value of bias current 211 may be selected such that transistors 201 and 202 are configured to operate in a saturation region of operation. As used herein, the saturation region of operation is a region of operation for a field-effect transistor when the transistor's gate-to-source voltage is greater than the transistor's threshold voltage, and the transistor's drain-to-source voltage is greater than a difference of the transistor's gate-to-source voltage and the transistor's threshold voltage. Transistor 205 may, in different embodiments, be implemented using a p-channel MOSFET, FinFET, GAAFET, or any other suitable transconductance device.

Transistor 201 is coupled between node 208 and node 209, while transistor 202 is coupled between node 208 and node 210. A control terminal of transistor 201 is coupled to ground supply node 207, and a control terminal of transistor 202 is coupled to feedback voltage 112. In various embodiments, transistor 201 may correspond to transistor 114 and have threshold voltage 104, while transistor 202 may correspond to transistor 115 and have threshold voltage 105. In some embodiments, transistors 201 and 202 may be implemented using p-channel MOSFETs, FinFETs, GAAFETs, or any other suitable transconductance devices.

As described above, transistor threshold voltage 104 can be different from transistor threshold voltage 105. In some embodiments, transistor threshold voltage 104 may be greater than transistor threshold voltage 105. In such cases, transistors 201 and 202 form an asymmetric differential pair configured to asymmetrically amplify the difference between the respective gate-to-source voltages of transistors 201 and 202 to generate control signal 111 on node 210. The value of control signal 111, in conjunction with output circuit 102 and divider circuit 103, can result in a value of feedback voltage 112 that corresponds to a difference between transistor threshold voltage 104 and transistor threshold voltage 105.

Transistor 203 is coupled between node 209 and ground supply node 207, while transistor 204 is coupled between node 210 and ground supply node 207. Control terminals for both transistors 203 and 204 are coupled to node 209. In various embodiments, transistors 203 and 204 function as a current mirror circuit configured to generate current 213 such that a value of current 213 is based on a value of current 212 and the respective electrical and physical properties of transistors 203 and 204. In some embodiments, the electrical properties of transistors 203 and 204 are substantially the same by selecting the same width and length parameters for the two transistors. In such cases, the value of current 213 will be substantially the same as the value of current 212. In various embodiments, transistors 203 and 204 may be implemented as n-channel MOSFETs, FinFETs, GAAFETs, or any other suitable transconductance devices.

Figure 3:
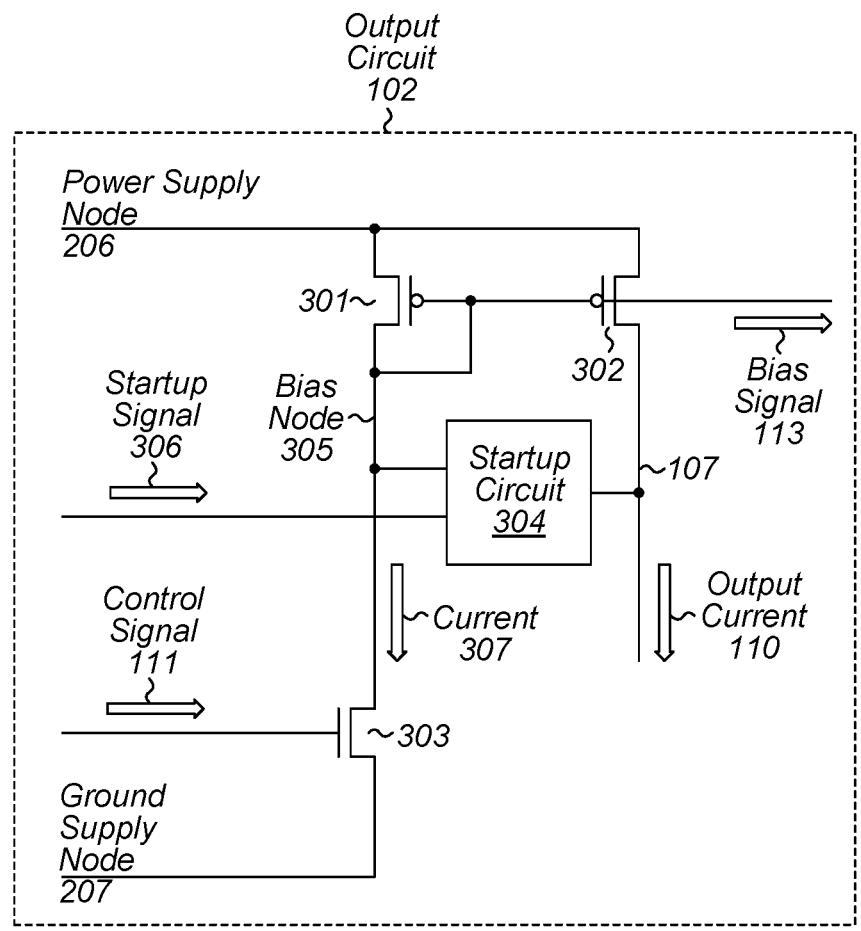
FIG. 3 is a block diagram of an embodiment of an output circuit for a voltage reference circuit.

A block diagram of output circuit 102 is depicted in FIG. 3. As illustrated, output circuit 102 includes transistors 301-303, and startup circuit 304. It is noted that although transistors 301-303 are depicted as single transistors, in various embodiments, any of transistors 301-303 may be implemented using any suitable number of transistors coupled together in a series and/or parallel arrangement.

Transistor 301 is coupled between power supply node 206 and bias node 305, while transistor 302 is coupled between power supply node 206 and node 107. Respective control terminals of transistors 301 and 302 are coupled to bias node 305. In various embodiments, transistors 301 and 302 function as a current mirror circuit configured to generate output current 110 such that a value of output current 110 is based on a value of current 307 and the respective electrical and physical properties of transistors 301 and 302. In some embodiments, the electrical properties of transistors 301 and 302 are substantially the same, which can be accomplished by selecting the same width and length parameters for the two transistors. In such cases, the value of output current 110 will be substantially the same as the value of current 307.

In some cases, the value of output current 110 can be adjusted up or down relative to the value of current 307 by changing the electrical properties of transistor 302 relative to transistor 301. For example, selecting a larger width for transistor 302 than for transistor 301 can result in the value of output current 110 being greater than the value of current 307. In some embodiments, physical properties, e.g., transistor width, of transistors 301 and 302 can be trimmed post-manufacture to achieve a desired value for output current 110. In various embodiments, transistors 301 and 302 may be implemented using p-channel MOSFETs, FinFETS, GAAFETs, or any other suitable transconductance devices.

Transistor 303 is coupled between bias node 305 and ground supply node 207 and is controlled by control signal 111. In various embodiments, a voltage level of control signal 111 adjusts a conductance of transistor 303, establishing current 307 in bias node 305. As current 307 flows from power supply node 206, through transistors 301 and 303 into ground supply node 207, a voltage is developed on bias node 305, thereby generating bias signal 113. In various embodiments, transistor 303 may be implemented using an n-channel MOSFET, FinFET, GAAFET, or any other suitable transconductance device.

Startup circuit 304 is configured to initialize bias signal 113 using startup signal 306 and reference voltage 109 on node 107. As described below, startup circuit 304 may be configured to discharge bias node 305 in response to an activation of startup signal 306, and in response to a determination that a value of reference voltage 109 is less than a threshold value. By initializing bias signal 113 during a startup operation, a state of amplifier circuit 101 can be determined as voltage reference circuit 100 powers up, thereby preventing incorrect operation of amplifier circuit 101 which could result in an incorrect value for reference voltage 109.

Figure 4:
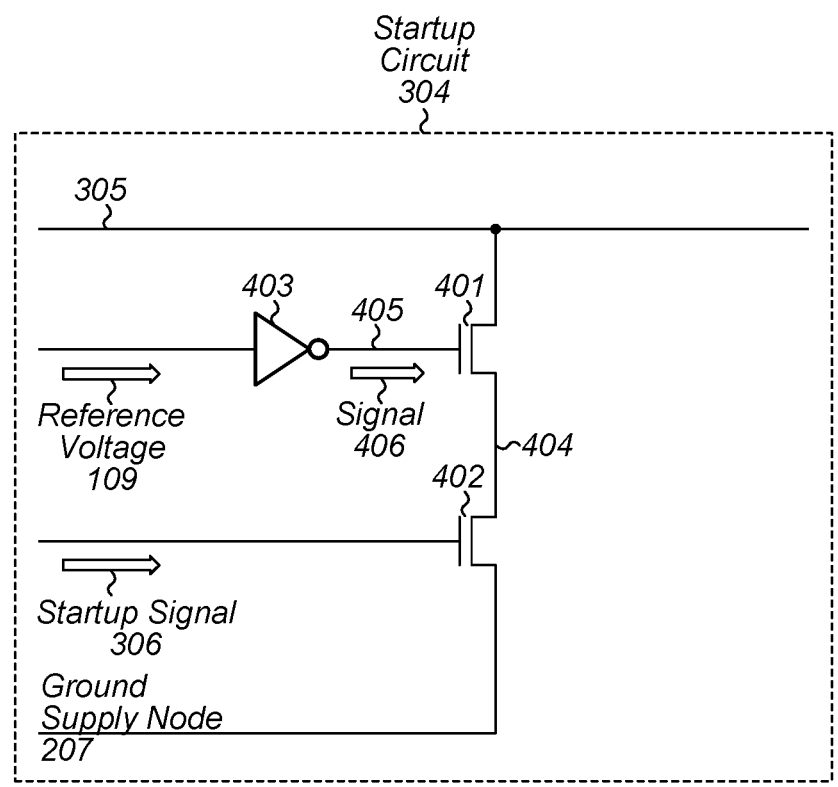
FIG. 4 is a block diagram of an embodiment of a startup circuit for a voltage reference output circuit.

Turning to FIG. 4, a block diagram of startup circuit 304 is depicted. As illustrated, startup circuit 304 includes transistors 401 and 402, and inverter 403. It is noted that although transistors 401 and 402 are depicted as single transistors, in other embodiments, any of transistors 401 or 402 may be implemented using any suitable number of transistors coupled together in a series and/or parallel arrangement.

Transistor 401 is coupled between node 305 and node 404, and is controlled by signal 406. In a similar fashion, transistor 402 is coupled between node 404 and ground supply node 207, and is controlled by startup signal 306. In various embodiments, transistors 401 and 402 may be implemented using n-channel MOSFETs, FinFETs, GAAFETs, or any other suitable transconductance devices.

Transistor 401 is configured to couple node 305 to node 404 when signal 406 is a logical-1. Transistor 402 is configured to couple node 404 to ground supply node 207 when startup signal 306 is a logical-1. When reference voltage 109 is at or near ground potential and startup signal 306 is a logical-1, both transistor 401 and transistor 402 are active, creating a conduction path between node 305 and ground supply node 207. As current flows from node 305 into ground supply node 207 along the conduction path, the voltage on node 305 decreases, resulting in a decrease in the voltage level of bias signal 113. As the voltage level of bias signal 113 decreases, current through transistors 301 and 302 increases. Additionally, the conductance of transistor 205 increases, thereby increasing bias current 211, helping to bias transistors 201 and 202 in the saturation region of operation needed for the operation of amplifier circuit 101.

As used and described herein, a logical-0, logic 0 value, or low logic level, describes a voltage sufficient to activate a p-channel MOSFET, FinFET, GAAFET, or other suitable transconductance device, and a logical-1, logic 1 value, or high logic level describes a voltage level sufficient to activate an n-channel MOSFET, FinFET, GAAFET, or other suitable transconductance device. It is noted that, in various other embodiments, any suitable voltage levels for logical-0 and logical-1 may be employed.

Inverter 403 is configured to generate signal 406 using reference voltage 109. In some embodiments, inverter 403 is configured to invert a value of reference voltage 109 to generate signal 406. For example, if a voltage level of reference voltage 109 is at or near ground potential, inverter 403 will generate signal 406 such that a voltage level of signal 406 is at or near a voltage level of a power supply node coupled to inverter 403. In various embodiments, inverter 403 may be implemented using any suitable number of p-channel and n-channel MOSFETs, FinFETs, GAAFETs, or any other suitable transconductance devices configured to perform an inverting amplification operation on reference voltage 109 to generate signal 406.

Figure 5:
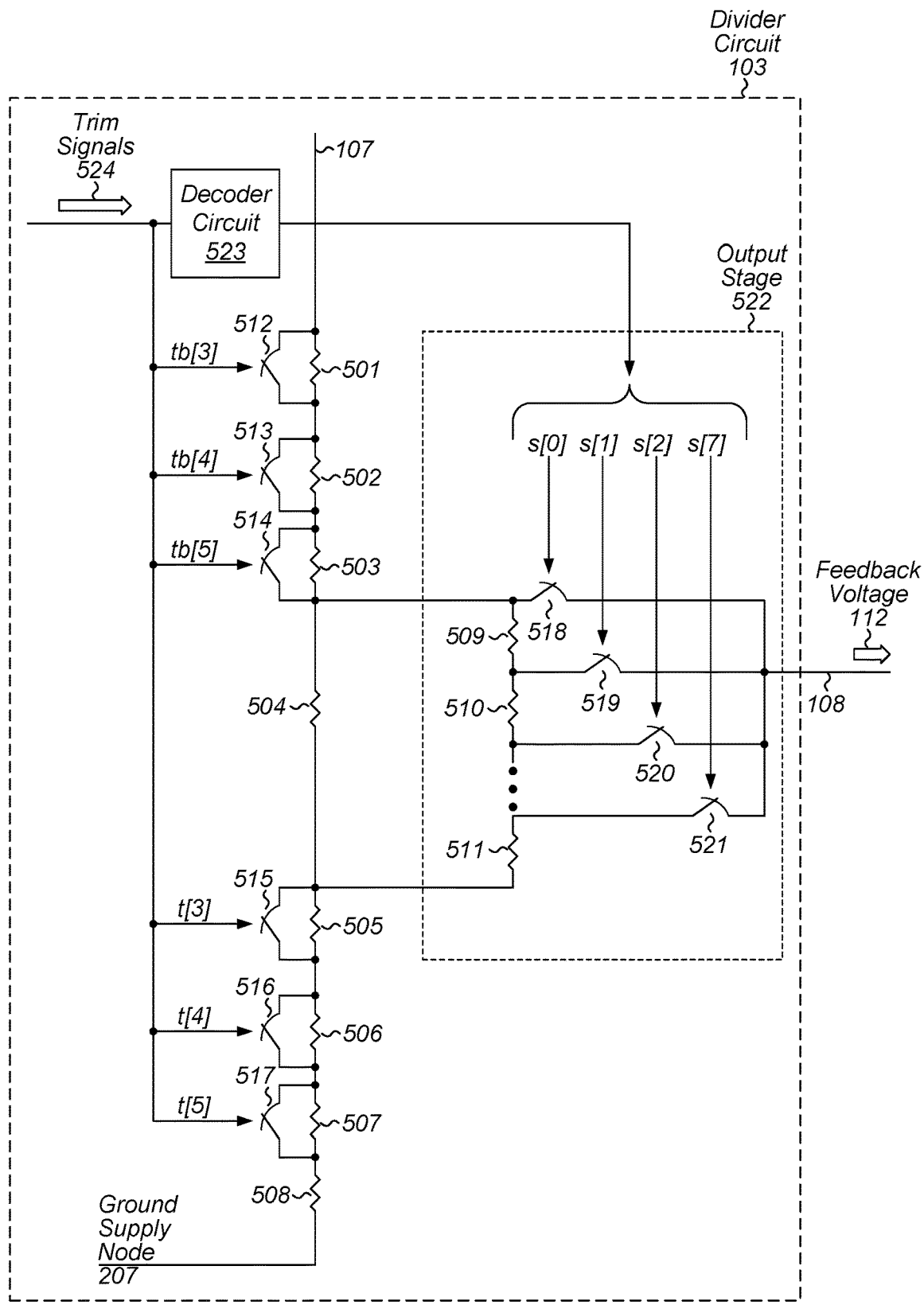
FIG. 5 is a block diagram of an embodiment of a divider circuit for a voltage reference circuit.

Turning to FIG. 5, a block diagram of an embodiment of divider circuit 103 is depicted. As illustrated, divider circuit 103 includes resistors 501-511, switches 512-521, and decoder circuit 523. Resistors 509-511 and transistors 518-521 are grouped together in output stage 522.

Resistors 501-508 are coupled, in series, between node 107 and ground supply node 207. Switches 512-514 are coupled in parallel with resistors 501-503, respectively, and switches 515-517 are coupled in parallel with resistors 505-507, respectively. Switches 512-514 are controlled by the complement of bits 3-5 (denoted "tb[3]-tb[5]") of trim signals 524. In a similar fashion, switches 515-517 are controlled by bits 3-5 (denoted "t[3]-t[5]") of trim signals 524.

In various embodiments, trim signals 524 may be determined post-manufacture, as part of a test operation during which the values of reference voltage 109 and/or feedback voltage 112 are checked. Values for trim signals 524 may be determined based on a difference in the values of reference voltage 109 and/or feedback voltage 112 from respective desired values. In some embodiments, the values for trim signals 524 may be stored in a one-time programmable memory circuit, or any other suitable type of non-volatile memory circuit.

In various embodiments, changing the values of bits 3-5 of trim signals 524 causes different one of switches 512-517 to open and close. When a particular one of switches 512-517 are closed, a corresponding one of resistors 501-503 and 505-507 is shorted, thereby decreasing the resistance between node 107 and ground supply node 207. Such a change in resistance may change a value of reference voltage 109 and feedback voltage 112.

Decoder circuit 523 is configured to decode trim signals 524 to generate decoded signals s[0]-s[7]. In various embodiments, decoded signals s[0]-s[7] may be implemented as one-hot decoded signals. For the purpose of clarity, decoded signals s[3]-s[6] are not shown in FIG. 5. In various embodiments, decoder circuit 523 uses lower order bits, e.g., bits 2-0 of trim signals 524 to generate decoded signals s[0]-s[7]. Decoder circuit 523 may be implemented using any suitable combination of logic gates.

Output stage 522 is configured to adjust the value of feedback voltage 112 by selecting a different amount of resistance from the top of resistor 504 to node 108. Resistors 509-511 are coupled in parallel to resistor 504. Although only three resistors are depicted in output stage 522, in other embodiments, any suitable number of resistors may be employed.

Each of switches 518-521 are coupled between node 108 and corresponding ones of the intermediate nodes between resistors 509-511 to form a wired-OR structure. Switches 518-521 are controlled by corresponding ones of decoded signals s[0]-s[7]. By activating different ones of s[0]-s[7], the amount of resistance from the top of resistor 504 to node 108 is changed, thereby adjusting the value of feedback voltage 112.

Resistors 501-511 may be implemented using metal, polysilicon, or any other suitable material available in a semiconductor manufacturing process. Although depicted as individual resistors, in other embodiments, any of resistors 501-511 may be implemented using any suitable series and/or parallel combination of multiple resistors. In some embodiments, any of resistors 501-511 may be implemented using one or more transistors biased to provide a particular resistance between their source and drain terminals.

Switches 512-521 may be implemented using one or more transistors. For example, any of switches 512-521 may be implemented using an n-channel MOSFET, FinFET, GAAFET, or any other suitable transconductance device, a p-channel MOSFET, FinFET, GAAFET, or any other suitable transconductance device, or both coupled in parallel.

To summarize, various embodiments of a voltage reference circuit are disclosed. Broadly speaking, a voltage reference circuit includes an output circuit, a divider circuit, and an amplifier circuit. The output circuit may be configured to generate an output current and a bias signal using a control signal. The divider circuit may be configured to generate a feedback voltage and a reference voltage using the output current. The amplifier circuit may include a first transistor a second transistor manufactured according to a particular manufacturing process having a plurality of available threshold voltages, the first transistor having a first threshold voltage of the plurality of threshold voltages and the second transistor having a second, different threshold voltage of the plurality of threshold voltages. The amplifier circuit may be configured to generate the control signal using the feedback voltage, the bias signal, and a difference between the first threshold voltage and the second threshold voltage.

Figure 6:
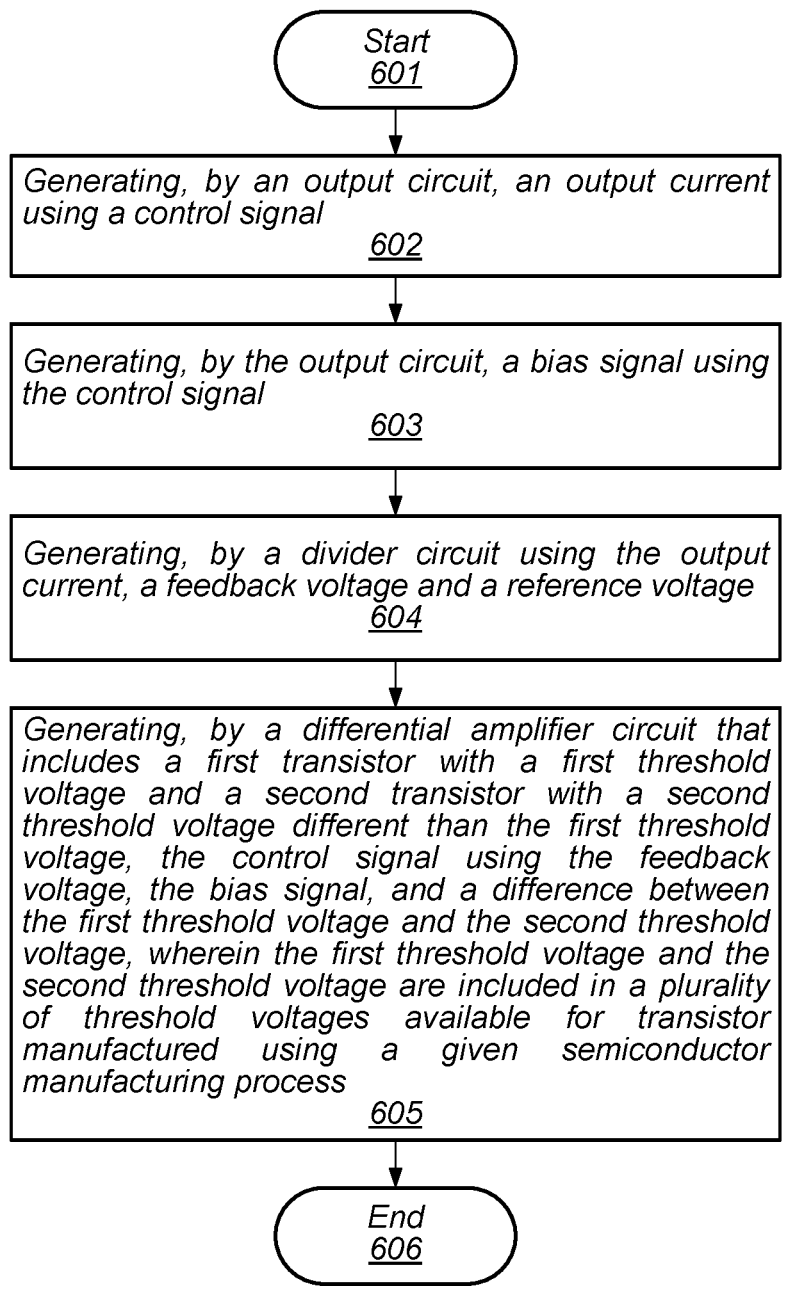
FIG. 6 is a flow diagram of an embodiment of a method for operating a voltage reference circuit.

A flow diagram depicting an embodiment of a method for operating a voltage reference circuit to generate a reference voltage is illustrated in FIG. 6. The method, which may be applied to various voltage reference circuits such as voltage reference circuit 100 as depicted in FIG. 1, begins in block 601.

The method includes generating, by an output circuit, an output current using a control signal (block 602). In some embodiments, generating the output current may include generating a first current using the control signal, and generating, by a current mirror circuit using the first current, the output current.

The method further includes generating, by the output circuit, a bias signal using the control signal (block 603). In some embodiments, generating the bias signal may include generating, by the current mirror circuit using the first current, a bias current. As described below, the bias current may be used to bias one or more transistors included in a differential amplifier circuit that are included in the voltage reference circuit.

In various embodiments, the method may also include initializing the bias signal during a startup operation. Initializing the bias signal may, in some embodiments, include discharging a bias node in response to activating a startup signal and in response to determining that the reference voltage is less than a threshold value.

The method also includes generating, by a divider circuit using the output current, a feedback voltage and a reference voltage (block 604). In various embodiments, the divider circuit includes a variable resistor through which the output current flows. In such cases, the method may include adjusting, using a trim control signal, a value of the variable resistor to modify a value of the reference voltage and/or the feedback signal.

In some cases, the method may include measuring the reference voltage at a middle point of the range of resistances available in the divider circuit. The method may also include determining a trim code based on a ratio of the measured value of the reference voltage to a desired value for the reference voltage. The method may further include programming the determined trim code into an integrated circuit included in voltage reference circuit 100 using fuses, a one-time programmable memory circuit, or any other suitable type of non-volatile memory circuit.

The method further includes generating, by a differential amplifier circuit that includes a first transistor with a first threshold voltage and a second transistor with a second threshold voltage different than the first threshold voltage, the control signal using the feedback voltage, the bias signal, and a difference between the first threshold voltage and the second threshold voltage (block 605).

In some embodiments, the first transistor and the second transistor are metal-oxide field-effect transistors. In such cases, the method may further include biasing the first transistor and the second transistor in a saturation region of operation. The method concludes in block 606.

Figure 7:
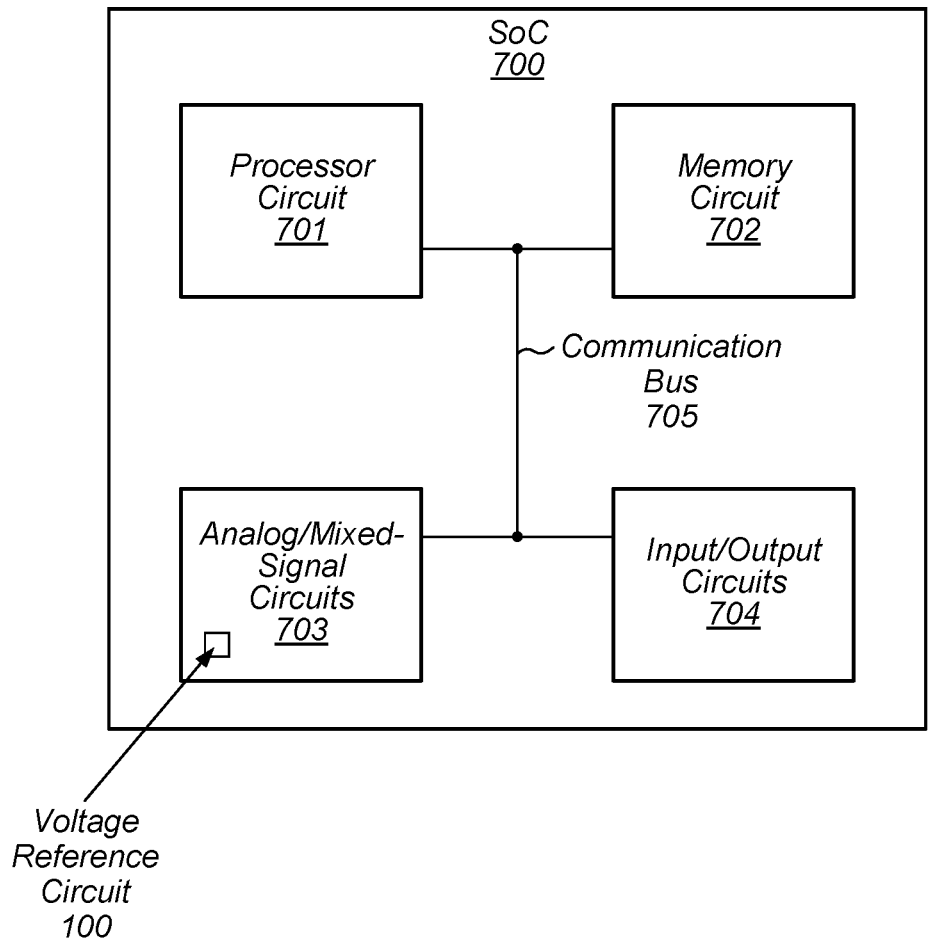
FIG. 7 is a block diagram of one embodiment of a system-on-a-chip that includes a voltage reference circuit.

A block diagram of a system-on-a-chip (SoC) is illustrated in FIG. 7. In the illustrated embodiment, SoC 700 includes processor circuit 701, memory circuit 702, analog/mixed-signal circuits 703, and input/output circuits 704 each of which is coupled to communication bus 705. In various embodiments, SoC 700 may be configured for use in a desktop computer, server, or in a mobile computing application such as, e.g., a tablet, laptop computer, or wearable computing device.

Processor circuit 701 may, in various embodiments, be representative of a general-purpose processor that performs computational operations. For example, processor circuit 701 may be a central processing unit (CPU) such as a microprocessor, a microcontroller, an application-specific integrated circuit (ASIC), or a field-programmable gate array (FPGA).

Memory circuit 702 may, in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that although a single memory circuit is illustrated in FIG. 7, in other embodiments, any suitable number of memory circuits may be employed.

Analog/mixed-signal circuits 703 may include a crystal oscillator circuit, a phase-locked loop (PLL) circuit, an analog-to-digital converter (ADC) circuit, and a digital-to-analog converter (DAC) circuit (all not shown). In other embodiments, analog/mixed-signal circuits 703 may be configured to perform power management tasks with the inclusion of on-chip power supplies and voltage regulators. In some embodiments, analog/mixed-signal circuits 703 may include voltage reference circuit 100 as depicted in FIG. 1.

Input/output circuits 704 may be configured to coordinate data transfer between SoC 700 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 704 may be configured to implement a version of Universal Serial Bus (USB) protocol or IEEE 1394 (Firewire®) protocol.

Input/output circuits 704 may also be configured to coordinate data transfer between SoC 700 and one or more devices (e.g., other computing systems or integrated circuits) coupled to SoC 700 via a network. In one embodiment, input/output circuits 704 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 704 may be configured to implement multiple discrete network interface ports.

Figure 8:
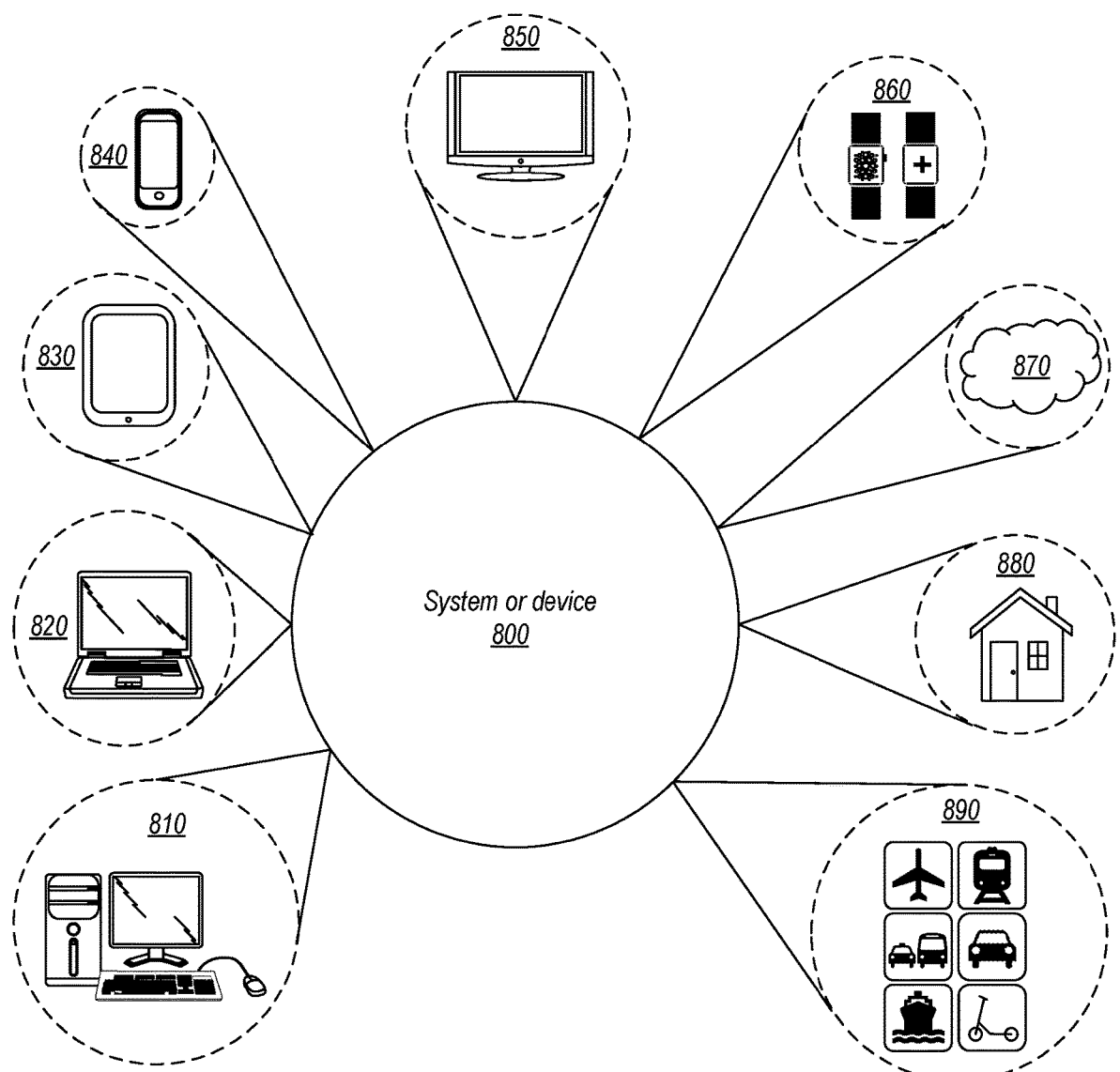
FIG. 8 is a block diagram of various embodiments of computer systems that may include power converter circuits.

Turning now to FIG. 8, various types of systems that may include any of the circuits, devices, or systems discussed above are illustrated. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Figure 9:
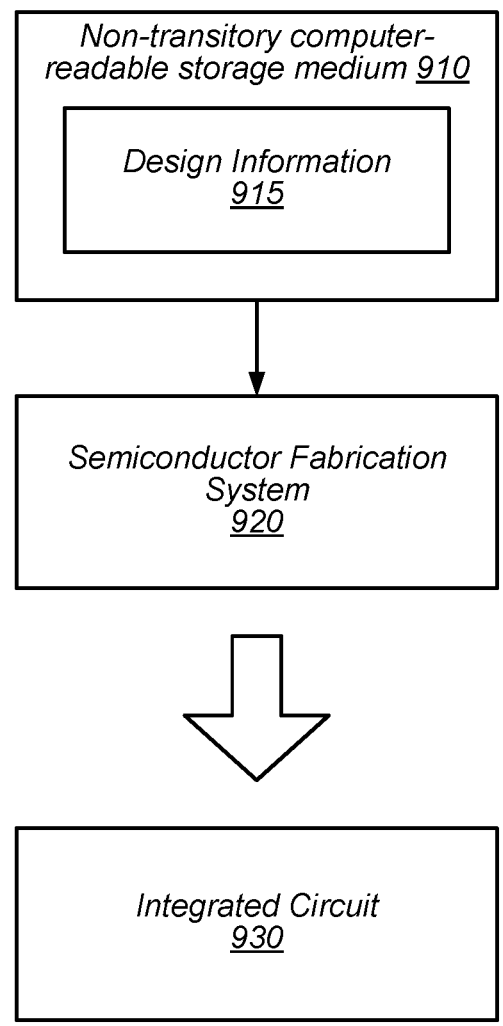
FIG. 9 illustrates an example of a non-transitory computer-readable storage medium that stores circuit design information.

FIG. 9 is a block diagram illustrating an example of a non-transitory computer-readable storage medium that stores circuit design information, according to some embodiments. In the illustrated embodiment, semiconductor fabrication system 920 is configured to process design information 915 stored on non-transitory computer-readable storage medium 910 and fabricate integrated circuit 930 based on design information 915.

Non-transitory computer-readable storage medium 910 may comprise any of various appropriate types of memory devices or storage devices. Non-transitory computer-readable storage medium 910 may be an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash or magnetic media (e.g., a hard drive), or optical storage; registers, or other similar types of memory elements, etc. Non-transitory computer-readable storage medium 910 may include other types of non-transitory memory as well as combinations thereof. Non-transitory computer-readable storage medium 910 may include two or more memory mediums, which may reside in different locations, e.g., in different computer systems that are connected over a network.

Design information 915 may be specified using any of various appropriate computer languages, including hardware description languages such as, without limitation: VHDL, Verilog. SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system, such as semiconductor fabrication system 920, for example. In some embodiments, design information 915 may include a netlist that specifies elements of a cell library, as well as their connectivity. One or more cell libraries used during logic synthesis of circuits included in integrated circuit 930 may also be included in design information 915. Such cell libraries may include information indicative of device or transistor level netlists, mask design data, characterization data, and the like, of cells included in the cell library.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown or described herein. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112 (f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   an output circuit configured to generate an output current and a bias signal using a control signal;
   a divider circuit configured to generate a feedback voltage and a reference voltage using the output current; and
   an asymmetric differential amplifier circuit including a first transistor and a second transistor manufactured according to a particular manufacturing process having a plurality of available threshold voltages, the first transistor having a first threshold voltage of the plurality of threshold voltages and the second transistor having a second, different threshold voltage of the plurality of threshold voltages, wherein the amplifier circuit is configured to generate the control signal using the feedback voltage, the bias signal, and a difference between the first threshold voltage and the second threshold voltage.

2. The apparatus of claim 1, wherein the first transistor is a metal-oxide semiconductor field-effect transistor configured to operate in a saturation region of operation, and wherein the second transistor is a metal-oxide semiconductor field-effect transistor configured to operate in the saturation region of operation.

3. The apparatus of claim 1, wherein the output circuit includes a startup circuit configured to initialize the bias signal during a startup operation.

4. The apparatus of claim 3, wherein to initialize the bias signal, the startup circuit is further configured to discharge, based on a startup signal and the reference voltage, a bias node through which the bias signal propagates.

5. The apparatus of claim 1, wherein the output circuit includes a current mirror circuit, wherein to generate the output current, the output circuit is further configured to generate a first current using the control signal, and wherein the current mirror circuit is configured to generate the output current using the first current.

6. The apparatus of claim 1, wherein the divider circuit includes a plurality of resistors coupled between the output circuit and a ground supply node, and wherein the divider circuit is further configured to adjust a value of at least one resistor of the plurality of resistors using a trim control signal.

7. A method, comprising:
   generating, by an output circuit, an output current using a control signal;
   generating, by the output circuit, a bias signal using the control signal;
   generating, by a divider circuit using the output current, a feedback voltage and a reference voltage; and
   generating, by a differential amplifier circuit that includes a first transistor and a second transistor manufactured according to a particular manufacturing process having a plurality of available threshold voltages, the first transistor having a first threshold voltage of the plurality of threshold voltages and the second transistor having a second, different threshold voltage of the plurality of threshold voltages, the control signal using the feedback voltage, the bias signal, and a difference between the first threshold voltage and the second threshold voltage.

8. The method of claim 7, wherein the first transistor and the second transistor are metal-oxide semiconductor field-effect transistors, and further comprising, biasing the first transistor and the second transistor to operate in a saturation region of operation.

9. The method of claim 7, further comprising initializing the bias signal during a startup operation.

10. The method of claim 9, wherein initializing the bias signal includes discharging a bias node in response to activating a startup signal, and in response to determining that the reference voltage is less than a threshold value.

11. The method of claim 7, wherein generating the output current includes:
generating a first current using the control signal; and
generating, by a current mirror circuit using the first current, the output current.

12. The method of claim 11, wherein generating the bias signal includes generating, by a current mirror circuit using the first current, a bias current for the first transistor and the second transistor.

13. The method of claim 7, further comprising adjusting, using a trim control signal, a value of a variable resistor through which the output current flows to modify a value of the reference voltage.

14. An apparatus, comprising:
a computer system that includes:
a functional circuit block coupled to a reference node; and
a voltage reference circuit that includes a first transistor with a first threshold voltage and a second transistor with a second threshold voltage different than the first threshold voltage, wherein the voltage reference circuit is configured to:
generate an output current using a control signal;
generate a bias signal using the control signal;
generate, using the output current, a reference voltage on the reference node, and a feedback voltage; and
generate the control signal using the feedback voltage, the bias signal, and a difference between the first threshold voltage and the second threshold voltage.

15. The apparatus of claim 14, wherein the first transistor and the second transistor are a metal-oxide semiconductor field-effect transistors, and wherein the voltage reference circuit is further configured to bias the first transistor and the second transistor to operate in a saturation region of operation.

16. The apparatus of claim 14, wherein the voltage reference circuit is further configured to initialize the bias signal during a startup operation, and wherein the functional circuit block and the voltage reference circuit are located on a common integrated circuit included in the computer system.

17. The apparatus of claim 16, wherein to initialize the bias signal, the voltage reference circuit is further configured to discharge a bias node in response to an activation of a startup signal and in response to a determination that the reference voltage is less than a threshold value.

18. The apparatus of claim 14, wherein to generate the output current, the voltage reference circuit is further configured to generate a first current using the control signal, and wherein the voltage reference circuit includes a current mirror circuit configured to generate the output current using the first current.

19. The apparatus of claim 18, wherein the current mirror circuit is further configured to generate a bias current for the first transistor and the second transistor using the first current.

20. The apparatus of claim 14, wherein the voltage reference circuit includes a variable resistor through which the output current flows, and wherein the voltage reference circuit is further configured to adjust a value of the variable resistor using a trim control signal.

* * * * *